United States Patent
Coughlan et al.

(10) Patent No.: US 7,460,150 B1
(45) Date of Patent: Dec. 2, 2008

(54) USING GAZE DETECTION TO DETERMINE AN AREA OF INTEREST WITHIN A SCENE

(75) Inventors: Marc William Joseph Coughlan, Rozelle (AU); Alexander Quentin Forbes, Westleigh (AU); Paul Roller Michaelis, Louisville, CO (US); Peter D. Runcie, Bilgola Plateau (AU); Alexander Martin Scholte, Phegans Bay (AU); Ralph Warta, Neutral Bay (AU)

(73) Assignee: Avaya Inc., Basking Ridge, NJ (US)

( * ) Notice: Subject to any disclaimer, the term of this patent is extended or adjusted under 35 U.S.C. 154(b) by 630 days.

(21) Appl. No.: 11/080,763

(22) Filed: Mar. 14, 2005

(51) Int. Cl.
  *H04N 5/225* (2006.01)
  *H04N 7/14* (2006.01)
  *H04N 5/222* (2006.01)

(52) U.S. Cl. ............... 348/169; 348/14.01; 348/333.03

(58) Field of Classification Search ............... 348/169, 348/14.01, 14.08, 14.09, 14.16, 333.03
See application file for complete search history.

(56) References Cited

U.S. PATENT DOCUMENTS

| | | | |
|---|---|---|---|
| 4,791,660 A | 12/1988 | Oye et al. | |
| 5,164,992 A | 11/1992 | Turk et al. | |
| 5,206,903 A | 4/1993 | Kohler et al. | |
| 5,280,561 A | 1/1994 | Satoh et al. | |
| 5,349,379 A * | 9/1994 | Eichenlaub | 348/169 |
| 5,430,473 A | 7/1995 | Beecher, II et al. | |
| 5,506,872 A | 4/1996 | Mohler | |
| 5,619,254 A | 4/1997 | McNelley | |
| 5,675,376 A | 10/1997 | Andersson et al. | |
| 5,731,805 A | 3/1998 | Tognazzini et al. | |
| 5,828,747 A | 10/1998 | Fisher et al. | |
| RE36,041 E | 1/1999 | Turk et al. | |
| 5,905,793 A | 5/1999 | Flockhart et al. | |
| 5,982,873 A | 11/1999 | Flockhart et al. | |
| 5,986,703 A | 11/1999 | O'Mahony | |
| 6,046,767 A | 4/2000 | Smith | |
| 6,163,607 A | 12/2000 | Bogart et al. | |
| 6,173,053 B1 | 1/2001 | Bogart et al. | |
| 6,192,122 B1 | 2/2001 | Flockhart et al. | |
| 6,463,220 B1 | 10/2002 | Dance et al. | |
| 6,483,531 B1 | 11/2002 | Ryu | |

(Continued)

FOREIGN PATENT DOCUMENTS

EP          0 118 182          9/1985

(Continued)

OTHER PUBLICATIONS

U.S. Appl. No. 10/459,182.*

(Continued)

*Primary Examiner*—Lin Ye
*Assistant Examiner*—Jason Whipkey
(74) *Attorney, Agent, or Firm*—Sheridan Ross P.C.

(57) ABSTRACT

Using gaze detection to determine image information collected from a scene. In order to determine the gaze of persons within a scene, images of the faces of those persons are obtained, and the gaze or line of sight of those persons is determined. Image information encompassing an area of the scene at which the gazes of persons at the scene are directed is then obtained. The obtained video information may be displayed in realtime, or recorded for later viewing.

31 Claims, 5 Drawing Sheets

U.S. PATENT DOCUMENTS

| | | | |
|---|---|---|---|
| 6,496,217 B1 | 12/2002 | Piotrowski | |
| 6,498,684 B1 | 12/2002 | Gladnick et al. | |
| 6,507,356 B1 | 1/2003 | Jackel et al. | |
| 6,556,196 B1 | 4/2003 | Blanz et al. | |
| 6,593,955 B1 | 7/2003 | Falcon | |
| 6,597,736 B1 | 7/2003 | Fadel | |
| 6,603,491 B2 | 8/2003 | Lemelson et al. | |
| 6,680,745 B2 | 1/2004 | Center, Jr. et al. | |
| 6,744,927 B1 | 6/2004 | Kato | |
| 6,753,900 B2 | 6/2004 | Runcie et al. | |
| 6,801,642 B2 | 10/2004 | Gorday et al. | |
| 6,878,924 B2 | 4/2005 | Baron | |
| 7,023,464 B1 | 4/2006 | Harada et al. | |
| 7,091,928 B2 | 8/2006 | Rajasingham | |
| 7,269,292 B2 | 9/2007 | Steinberg | |
| 7,425,981 B2 | 9/2008 | Kamariotis | |
| 2002/0061131 A1 | 5/2002 | Sawhney et al. | |
| 2002/0113662 A1 | 8/2002 | Center, Jr. et al. | |
| 2003/0117486 A1* | 6/2003 | Ferren et al. | 348/14.08 |
| 2004/0012613 A1 | 1/2004 | Rast | |
| 2004/0210844 A1 | 10/2004 | Pettinati et al. | |
| 2005/0093971 A1* | 5/2005 | Ono et al. | 348/14.08 |
| 2005/0210105 A1* | 9/2005 | Hirata et al. | 709/205 |
| 2005/0248651 A1* | 11/2005 | Hirata et al. | 348/14.08 |

FOREIGN PATENT DOCUMENTS

| | | |
|---|---|---|
| JP | 401221086 A | 9/1989 |
| JP | 404344788 A | 12/1992 |
| JP | 05219269 | 8/1993 |
| WO | WO 99/57900 | 11/1999 |
| WO | WO 02/085018 | 10/2002 |

OTHER PUBLICATIONS

U.S. Appl. No. 10/941,199.*
U.S. Appl. No. 10/949,781.*
U.S. Appl. No. 11/025,493.*
Cisco Systems, Inc., "Cisco VT Advantage Video Telephony Solution," (1992-2004), pp. 1-6.
CDM Optics, "Image Gallery," (2001).
Toshiba Corporation Press Release, "Toshiba Announces World's First Image Recognition LSI for Intelligent Vehicle System," (Feb. 6, 2001), available at http://www.toshiba.co.jp/about/press/2001_02/pr0602.htm, 3 pages.
Jun, Song F. et al., *Optical Feature Recognition*, (Mar. 6, 1995), 1 page.
Peter Kauff Projects, "BS-Immersive Media & 3D Video Group," (Ed. Christoph Fehn, Nov. 12, 2002), 6 pages.
Kawato et al., *Image and Vision Computing*, "Detection and Tracking of Eyes for Gaze-camera Control," 22(12):1031-1038, Mar. 2004.
LMS, Blind Source Separation, 4 pages at http://www.Int.de/LMS/research/projects/BSS/index.php?lang=eng, printed Dec. 29, 2004.
Digibird.com, "Essential Optics for Digiscoping," (2002), available at http://www.digibird.com/primerdir/primer0.htm, 4 pages.
Fintzel et al., "Real Time 3D Navigation in a Static Virtualzied Scene from a Limited Set of 2D Data," IEEE Int'l Conf. on Multimedia & Expo 2000, New York, Electronic Proceedings, 11 pages.
The Imaging Source website, "Introduction to Optics and Lenses," (2003), available at http://www.theimagingsource.com/prod/opt/opticsintro_2.htm, 10 pages.
Mark et al., "Post-Rendering 3D Warping", In Proceedings of 1997 Symposium on Interactive 3D Graphics, Providence, RI, Apr. 27-30, 1997, pp. 7-16.
Marpe et al., "Video Compression Using Context-Based Adaptive Arithmetic Coding," Proc. IEEE International Conference on Image Processing (ICIP'01), vol. III, pp. 558-561, Oct. 2001.
Nikon MicroscopyU: Interactive Java Tutorials website, "Digital Camera Resolution Requirements for Optical Microscopy," (2000-2004), available at http://www.microscopyu.com/tutorials/java/digitalimaging/pixelcalculator, 4 pages.

"Nordic Guide to Video Telephony and Video Relay Service," The Nordic Forum for Telecommunication and Disability 2002, NFTH Mar. 2002, pp. 1-14.
Oshima, Shigeru, "Acquisition: Fundamental Optics of Television Camera Lenses," shortened version of the Fundamental Optics section in *Canon Guidebook of Television System Optics* ($2^{nd\ Ed.}$), (Jan. 2000), 13 pages.
Soongsathitanon, Somphob, et al., University of Newcastle upon Tyne, "A New Orthogonal Logarithmic Search Algorithm for Fixed Block-Based Motion Estimation for Video Coding," date unknown, 4 pages.
Techno World, "Multimedia Cameras for Visual Society: Ultraminiature Multimedia Camera Systems," (undated), 6 pages.
Wolberg, George, "Digital Image Warping," IEEE Computer Society Press Monograph (Mar. 4, 2002), available at http://www-cs.ccny.cuny.edu/~wolberg/diw.html, 7 pages.
Brandstein, Michael, "Real-Time Face Tracking Using Audio and Image Data," Harvard Intelligent Multi-Media Environment Laboratory (HIMMEL) (undated), pp. 1-22.
Eisert, Peter, "Immersive 3-D Video Conferencing: Challenges, Concepts, and Implementations," Proc. SPIE Visual Communications and Image Processing (VCIP), Lagano, Switzerland (Jul. 2003), 11 pages.
Imagis Technologies Inc. News Release, "Imagis Technologies Releases Major Upgrade to Face Recognition Software," (Sep. 2002).
Entropy Software Laboratory, "Image Recognition" (undated), available at http://www.entropysoftwarelab.com/technology/imageRecognition.html, 3 pages.
Sanyo Electric Co., Ltd., "Character and Image Recognition Technology," Technology R&D Headquarters (2003), available at http://www.sanyo.co.jp/R_and_D/english/theme/c-2.html, 2 pages.
"Blind Source Separation of recorded speech and music signals", available at http://www.cnl.salk.edu/~tewon/Blind/blind_audio.html, printed Dec. 29, 2004.
"Magic Morph 1.95" Internet printout from http://download.rol.ro/dhtml/magic_morph_195.htm; Copyright 2006; 2 pages.
"Nokia 6100 Cellular Phones", available at http://www.mediaplace.nl/nokia-6100-cellular-pho..., website updated Dec. 9, 2004, pp. 1-4.
"Student Voicemail Information", University of Saint Francis, available at http://www.sf.edu/computing/voicemail.shmtl, website updated Feb. 10, 2005, pp. 1-3.
"Eyegaze Analysis System"; LC Technologies, Inc.; http://www.eyegaze.com/2Products/Development/Developmentmain.htm; 2003; 9 pages.
"FRANN: Face Recognition Using Artificial Neural Network" html version of the file http://www.ece.stevens-tech.edu/ds/archie/03F-04S/deliverables/grp19/Fall_Proposal.pdf; date submitted Oct. 14, 2003; 43 pages.
"Gaze Point Detection"; http://wwwsyseng.rsise.anu.edu.au/rsl/hrintact/gazepoint.html; Oct. 24, 1997; 2 pages.
"Quick Glance 1"; Eye Tech Digital Systems; http://www.eyetechds.com/qglance1.htm; (date unknown); 2 pages.
Answers.com "Face Perception"; Internet printout from http://www.answers.com/topic/face-perception; printed Mar. 8, 2006; 8 pages.
Atienza et al.; "A Practical Zoom Camera Calibration Technique: An Application on Active Vision for Human-Robot Interaction"; Research School of Information Sciences and Engineering, The Australian National University, Canberra ACT 2000 Australia; (2001); 6 pages.
Bailenson et al.; "Transformed Facial Similarity as a Political Cue: A Preliminary Investigation"; In Press, Political Psychology; Department of Communication, Stanford University; 22 pages; undated.
Cula et al., "Recognition Methods for 3D Textured Surfaces"; Proceedings of SPIE conference of Human Vision and Electronic Imaging VI, San Jose, Jan. 2001.
Data Sheet entitled, "Motion Image Separation Technology," NetWatch® Mist® (undated), 2 pages.
Edwards et al.; "Interpreting Face Images Using Active Appearance Models"; html version of the file http://www.ai.mit.edu/courses/6.899/papers/aamFG98.pdf; printed Mar. 8, 2006; 11 pages.
Eigenface; Internet printout from http://en.wikipedia.org/wiki/Eigenface; printed Mar. 8, 2006; 2 pages.

Facial Recognition Overview, Imagis Technologies Inc. (2004), available at http://www.imagistechnologies.com/Products/FaceRecognition/, 1 page.

Kawato et al.; "Detection and Tracking of Eyes for Gaze-camera Control"; ATR Media Information Science Laboratories; available at http://www.cipprs.org/vi2002/pdf/s7-1.pdf, (2002); 6 pages.

Kim et al.; "Intelligent Process Control Via Gaze Detection Technology"; Aug. 3, 1999; 1 page.

Kurniawan et al.; "Design and User Evaluation of a Joystick-operated Full-screen Magnifier"; Conference on Human Factors in Computing Systems, Proceedings of the Conference on Human Factors in Computing Systems; 2003, 4 pages.

Machine Vision Technology, Neven Vision (2003-2004), available at http://www.nevenvision.com/technology, 10 pages.

Magee et al.; "EyeKeys: A Real-Time Vision Interface Based on Gaze Detection from a Low-grade Video Camera"; IEEE; 2004; 8 pages.

Motion Image Separation Technology, NetWatch® MIST (printed Feb. 9, 2005), available at http://www.ar-t.co.uk/mist_data.html, 2 pages.

NeuralWare products website entitled "NeuralWorks Predict," (2005), available at http://www.neuralware.com/products.jsp, 6 pages.

Padgett et al., "Categorical Perception in Facial Emotion Classification", Internet printout from http://72.14.207.104/search?q=cache:QVgZLtYu_efJ:www-cse.ucsd.edu/users/gary/pubs/padgett_cogsci96.ps+%22Eigen+face...; printed Mar. 8, 2006; 10 pages.

Partek website entitled, "Turning Data into Discovery," (2004), available at http://www.partek.com/, 1 page.

Perez et al.; "A Precise Eye-Gaze Detection and Tracking System"; Departamento de Artiquitectura y Tecnologia de Sistemas Informáticos (Department of Architecture and Technology of Systems Information)(DATSI); Feb. 2003, 4 pages.

Press Release, "Mobile Identifier Facial Recognition System Successfully Deployed by LAPD to Improve Neighborhood Safety," Neven Vision Inc. (Feb. 7, 2005), 2 pages.

Rickard, "Blind Source Separation", available at http://eleceng.ucd.ie/~srickard/bss.html, last modified Jul. 2, 2004, pp. 1-3.

Shih; "Assessing Bailenson, et al's Transformed social interaction: Decoupling representation from behavior and form in collaborative virtual environments"; http://www.stanford.edu/class/symbsys205/jshih_final.html; Jun. 8, 2005; 3 pages.

Software and Hardware for Data Analysis Pattern Recognition and Image Processing, The Pattern Recognition Files, maintained by Ela Pekalska (Jan. 24, 2004), available at http://www.ph.tn/tudelft.nl/PRInfo/software.html, 5 pages.

Soongsathitanon et al., "A New Orthogonal Logarithmic Search Algorithm for Fixed Block-Based Motion Estimation for Video Coding," date unknown.

TheFreeDictionary.com website entitled, "Feedforward," Farlex Inc. (2004), available at http://encyclopedia.thefreedictionary.com/feedforward, 3 pages.

TheFreeDictionary.com website entitled, "Genetic algorithm," Farlex Inc. (2004), available at http://encyclopedia.thefreedictionary.com/genetic%20algorithm, 6 pages.

TheFreeDictionary.com website entitled, "Image analysis," Farlex Inc., printed Jul. 7, 2008, available at http://encyclopedia.thefreedictionary.com/image%20analysis, pp. 1-3.

TheFreeDictionary.com website entitled, "Neural Network," Farlex Inc. (2004), available at http://encyclopedia.thefreedictionary.com/neural%20network, 6 pages.

TheFreeDictionary.com website entitled, "Neuroevolution," Farlex Inc. (2004), available at http://encyclopedia.thefreedictionary.com/Neuroevolution, 2 pages.

TheFreeDictionary.com website entitled, "Pattern recognition," Farlex Inc. (2004), available at http://encyclopedia.thefreedictionary.com/Pattern%20recognition, 3 pages.

TheFreeDictionary.com website entitled, "Sigmoid function," Farlex Inc. (2004), available at http://encyclopedia.thefreedictionary.com/sigmoid%function, 2 pages.

Background of the Invention for the above-captioned application (previously provided), Mar. 31, 2005.

* cited by examiner

USING GAZE DETECTION TO DETERMINE AN AREA OF INTEREST WITHIN A SCENE

FIELD OF THE INVENTION

The present invention is directed to using gaze detection to determine an area of interest within a scene. In particular, the line of sight or gaze of persons at a location is determined, and image information from an area indicated by the detected gaze is obtained.

BACKGROUND OF THE INVENTION

In order to control the image obtained by a camera, manual remote control systems for controlling the pan, zoom and other functions of a camera are available. Such systems can allow video conference participants at a first location to control the image that is provided to participants at a second video conference location. Alternatively or in addition, manual systems may allow video conference participants at a second location to control functions of the camera at the first video conference location. Accordingly, such systems require input from a user in order to provide appropriate image content. Furthermore, such systems can be difficult to operate from a remote location.

In video conference systems, it is desirable to provide the image of the current speaker to other video conference locations. Where there are a number of conference participants at one location, systems have been developed that use audio information in order to determine the current speaker and to point an imaging camera at that speaker. In particular, systems that rely on multiple microphones to determine the location of the current speaker through triangulation are available.

Although systems that use audio information for controlling a camera at a video conference location can adjust the image that is provided to a remote video conference location depending on sounds at the source video conference location, the operation of such systems has not been entirely satisfactory. For example, in noisy environments, spurious noises can cause the camera control system to thrash. In addition, such systems require the use of multiple microphones in order to enable triangulation to determine the source of the sounds. Also, where there are multiple speakers, such systems are typically unable to choose the most important speaker from between the multiple signals. In order to address this so called "cocktail party problem," techniques for electronically processing signals to separate desired signals from noise sources have been developed, but have had limited success. Audio-based systems are also unable to determine the location of a speaker using sign language. Furthermore, such systems are unable to determine if something other than a speaker, such as a white board or exhibit, should be imaged.

In connection with obtaining video imagery in surveillance-type applications, it is desirable to obtain imagery from areas within a scene where significant events are occurring. However, such areas generally cannot be determined in advance. As a result, adequate coverage of each area within a scene under surveillance may require a large number of cameras. However, because of the expense and complication of deploying a large number of cameras, such an approach is often impractical. As a result, cameras having a wide field of view are often used, which often results in low resolution, poor quality images of areas within the field of view that are determined to be of interest. Accordingly, it would be desirable to provide a system for controlling the areas of a scene imaged by a surveillance camera.

SUMMARY OF THE INVENTION

The present invention is directed to solving these and other problems and disadvantages of the prior art. In accordance with embodiments of the present invention, a system for controlling the output from a video camera that uses gaze detection is provided. In particular, the gaze or line of sight of one or more persons at a location is determined. An area within the scene intersected by the determined gaze of the persons in the scene may then be imaged. The image information thus obtained may be provided to a display in realtime and/or recorded for later analysis.

In accordance with embodiments of the present invention, gaze detection as described herein is used in connection with video conferencing. In particular, the location of a current speaker is determined from the gaze of other conference participants at that speaker's location. An imaging camera can then be pointed at that speaker, or imaging output restricted to an area that includes that speaker, and the output may be provided for display at another video conference location. Furthermore, such embodiments are not limited to imaging a current speaker, as areas of a scene comprising a white board or other visual display that the video conference participants are looking at can form all or part of the output image information. In accordance with still other embodiments of the present invention, the determination of a current speaker or area of interest using gaze detection as described herein can also be applied to selecting a relevant audio input and/or signal. Therefore, embodiments of the present invention may be applied to performing or assisting in the performance of blind source separation with respect to audio signals.

In accordance with still other embodiments of the present invention, gaze detection can be used in connection with determining the image information to display where a video conference comprises participants at three or more locations. For example, if the majority of participants at a first location are looking at another individual and not at a display screen, and the majority of participants at second and third locations are looking at the display screen, the conclusion that the first location is the active site can be reached, and the video feed from the first location can then be displayed at the second and third locations.

In accordance with other embodiments of the present invention, gaze detection for the control of image output as described herein can be used in connection with video surveillance. According to such embodiments, the gaze of persons within a scene can be determined, and an imaging camera can be controlled to provide an image that includes an area of the scene towards which the gaze of a majority of the persons within the scene is directed. The image information thus obtained can be displayed at a monitoring site in realtime and/or recorded for later analysis. In addition, the gaze of persons within a scene can be used to determine the location of an object of interest. In still other embodiments, an audio signal can be obtained from an area within a scene based on the gaze of persons within the scene.

Additional features and advantages of the present invention will become more readily apparent from the following description, particularly when taken together with the accompanying drawings.

DETAILED DESCRIPTION

Figure 1:
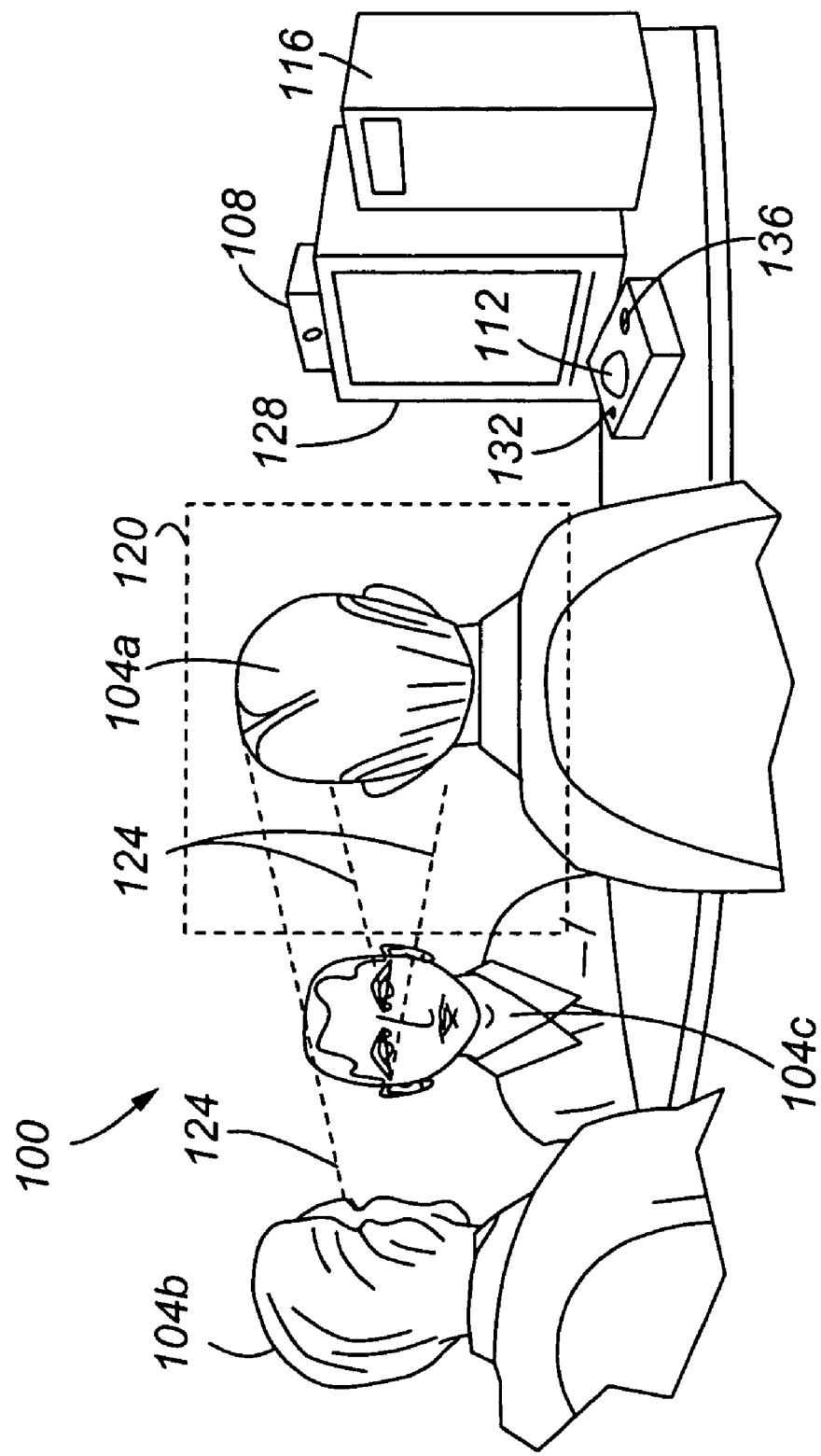
FIG. 1 depicts a scene from which image information may be obtained in accordance with embodiments of the present invention.

With reference now to FIG. 1, an example of a scene from which video information can be obtained is illustrated. As can be appreciated by one of skill in the art after consideration of the present disclosure, example contexts of a system in accordance with embodiments of the present invention include video conferencing and video surveillance. In general, the scene is of or corresponds to a first location 100 at which a number of persons 104 may be located. In addition, the first location generally includes components of a video endpoint 204 (see FIG. 2) or 304 (see FIG. 3), as will be described in greater detail elsewhere herein. Such components may include an imaging camera 108 and a gaze detection camera or device 112. The imaging camera 108 and gaze detection device 112 may further be associated with a central processing unit (CPU) 116.

In operation, the gaze detection device 112 obtains information regarding the direction of the gaze or line of sight of the various persons 104 at the first location 100. Accordingly, the gaze detection device 112 may comprise a wide angle camera, including a camera utilizing a fish eye lens, or a number of individual cameras arrayed to obtain an image that includes the face of at least some of the persons 104 at the location 100. Alternatively or in addition, the gaze detection unit 112 may comprise the imaging camera 108. Software executed by the central processing unit 116 can process the information obtained by the gaze detection unit 112, to determine an area 120 that is intersected by the lines of sight 124 of the majority of the persons 104 at the first location 100. Furthermore, the area 120 may comprise an area at which two or more gazes or lines of sight 124 of persons 104 intersect. The CPU 116 may then control the imaging camera 108 so that an image comprising the area 120 at which the gaze is 124 of the majority of persons 104 is directed is output. Accordingly, pan and zoom functions associated with the imaging camera 108 can be controlled to obtain an image substantially corresponding to the area 120. Alternatively or in addition, image information obtained by the imaging camera 108 may be cropped so that it corresponds to the area 120. Accordingly, a CPU 116 may comprise or implement a gaze detection function or module and a camera control function or module. The image information thus obtained may be displayed at another location in realtime and/or may be recorded. In connection with a location 100 comprising a video endpoint, a video monitor or display 128, audio input 132, and audio output 136 may also be provided. Furthermore, multiple instances of such devices or features may be provided. Although shown in association with three persons 104a, 104b and 104c, it should be appreciated that a system 100 is not limited to use in connection with any particular number of persons 104.

Figure 2:
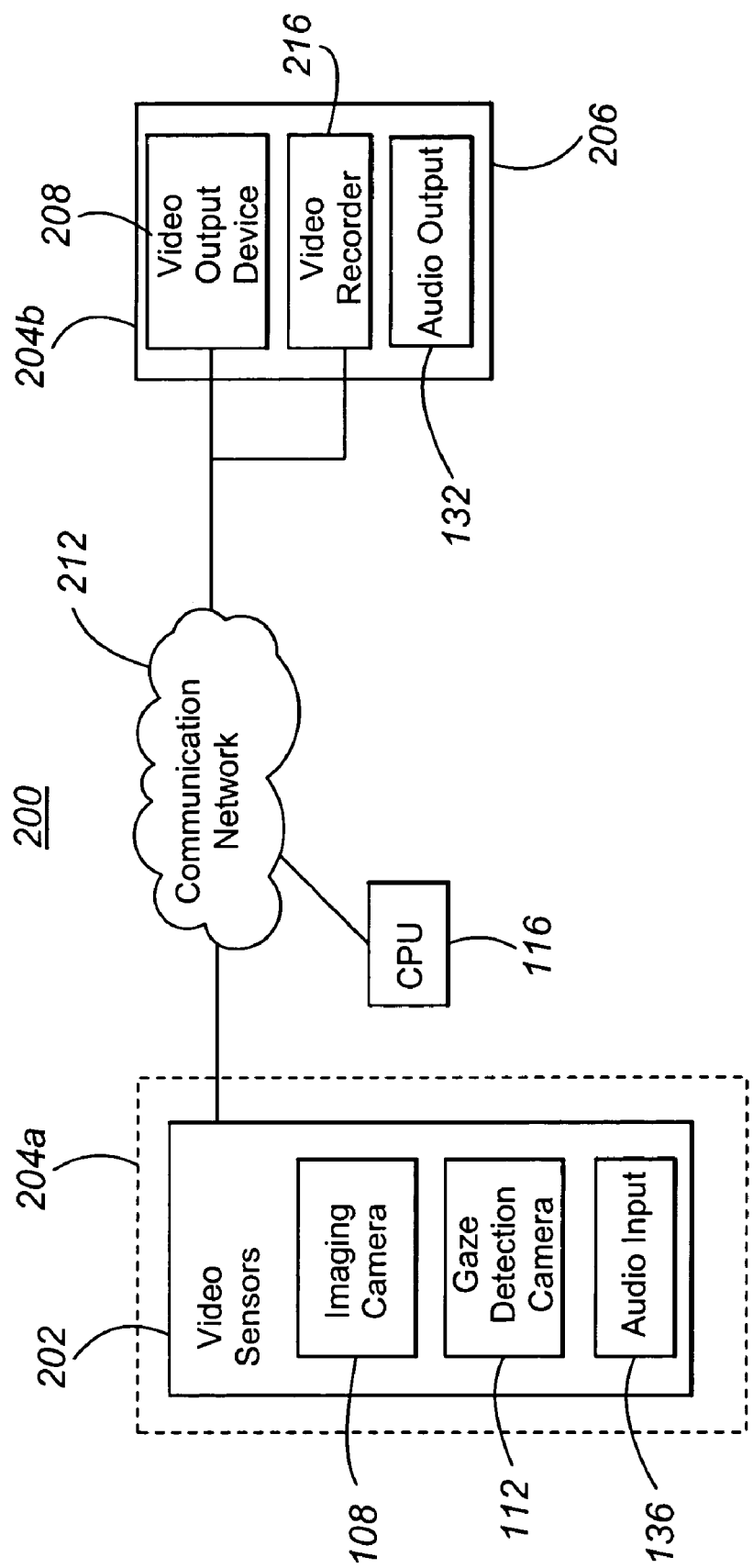
FIG. 2 is a schematic diagram of a system using gaze detection to control image output in accordance with embodiments of the present invention.

With reference now to FIG. 2, components of a system 200 using gaze detection to control image output in accordance with embodiments of the present invention are depicted. More particularly, FIG. 2 illustrates a system 200 in accordance with embodiments of the present invention that may be used in connection with surveillance or security applications. In general, the system 200 provides a first video endpoint 204a for collecting image and gaze information that includes video sensors 202 at a first location, and a second video endpoint 204b comprising a monitoring station 206. Output from at least one of the video sensors 202 is provided to the monitoring station 206 by a communication network 212. The monitoring station 206 may comprise a video output device 208 such as a video monitor or display. Alternatively or in addition, the monitoring station 206 may comprise a video recorder 216. The system 200 may further include a CPU 116 for controlling the operation of various included components. Although shown as a separate device, a CPU 116 may additionally or alternatively be integrated with the video endpoint 204 for collecting information and/or a video endpoint 204 comprising a video monitoring station 206.

The video sensors 204 may comprise an imaging camera 108 and a gaze detection camera or device 112. The imaging camera 108 may comprise a digital camera capable of providing full motion or near full motion video signals or still images. Accordingly, an example of an imaging camera 108 is a digital camera using a charge coupled device (CCD) as the image sensor. The imaging camera 108 may additional include digital and/or optical zoom capabilities to control the field of view of the imaging camera 108. Furthermore, the imaging camera 108 may comprise or be associated with motors to control the pan and/or tilt of the imaging camera 108.

The gaze detection camera 112 may be provided separately from the imaging camera 108. In accordance with embodiments of the present invention, the gaze detection camera 112 may comprise a device having a fish eye or other extremely wide angle optical lens, for example to provide an image that includes the faces of persons 104 seated around a conference table at a video conference location. The gaze detection camera or unit 112 also comprises or is operated in connection with a processor, for example provided by a central processing unit 116, to enable detection of the gaze or line of sight of imaged persons 104.

In accordance with still other embodiments of the present invention, the video sensors 202 may comprise an integrated imaging camera and gaze detection camera 108, 112. According to such embodiments, a wide field of view may be used in connection with gaze detection functions, while a selected portion of that field of view may be provided as part of an imaging function. Furthermore, in connection with the use of extremely wide angle lenses, selected fields of view may be processed to correct distortion resulting from the use of such a lens, for example prior to providing an image to a video output device 208.

The communication network 212 may comprise a packet data network, such as a local area network (LAN) and/or wide area network (WAN). Alternatively or in addition, the communication network 212 may comprise a dedicated connection between the video sensors 204 and the video output device 208 and/or video recorder 216. For example, the communication network 212 may comprise a serial packet data connection, such as a universal serial bus (USB) or IEEE 1394 connection, or an analog connection, for example using a coaxial cable. Furthermore, the connection between a CPU 116 and other components may be through the same communication network 212 used to interconnect the video sensors 208 to a video output device 208 and/or recorder 216, or a different communication network 212. For example, a communication network 212 comprising an IEEE 1394 connection may be used to interconnect the CPU 116 to an integrated imaging camera 108 and gaze detection camera 112, while a communication network 212 comprising an Ethernet network may be used to interconnect the CPU 116 to a video monitoring station 206.

The system 200, in an exemplary application, may provide images from a location under surveillance to a video output device 208 and/or recorder 216 provided as part of a monitoring station 206. For instance, when the location comprises a public space, such as a train station, the gaze detection camera or unit 112 may monitor the gazes of persons at the location. In response to determining that a majority of the persons at the location are looking at a particular area within that location, the imaging camera 108 can be controlled to output imaged data that includes that particular area. More particularly, a system 200 in accordance with embodiments of the present invention can be used to orient an imaging camera 108 and/or select a particular imaging camera 108 from a number of imaging cameras 108 at a location 100 appropriately in response to a significant event. Accordingly, the area or object of interest within a scene can be determined using the direction of the gazes or lines of sight of persons at a location (i.e., within a scene), and information related to the location of the event can be obtained by applying simple geometric concepts. For example, the location of an event can be identified as the point or area at which the gazes of a number of persons within a scene converge. The detection of a sudden shift in gaze by many people towards a specific area can be used to trigger an alert signal that can be provided to monitoring personnel. Furthermore, embodiments of a system 200 can provide an alert indicating that a significant event may have occurred, even in the absence of a traditional alarm. The alert may comprise a general alarm, and/or information related to the location of the event.

In accordance with still other embodiments of the present invention, a first video endpoint 204a may include one or more audio inputs 132 for collecting audio information from the first location for delivery to the second video endpoint 204b. The delivered audio information may be output by an audio output 136 or stored in the recorder 216. The audio inputs 136 may comprise a number of microphones. Furthermore, an audio input 132 may comprise a directional microphone. Information regarding the location of an area of interest within the scene determined using the direction of the gazes of persons at the location can be used to select a microphone within or near the area of interest, or to orient a directional microphone towards the area of interest.

Figure 3:
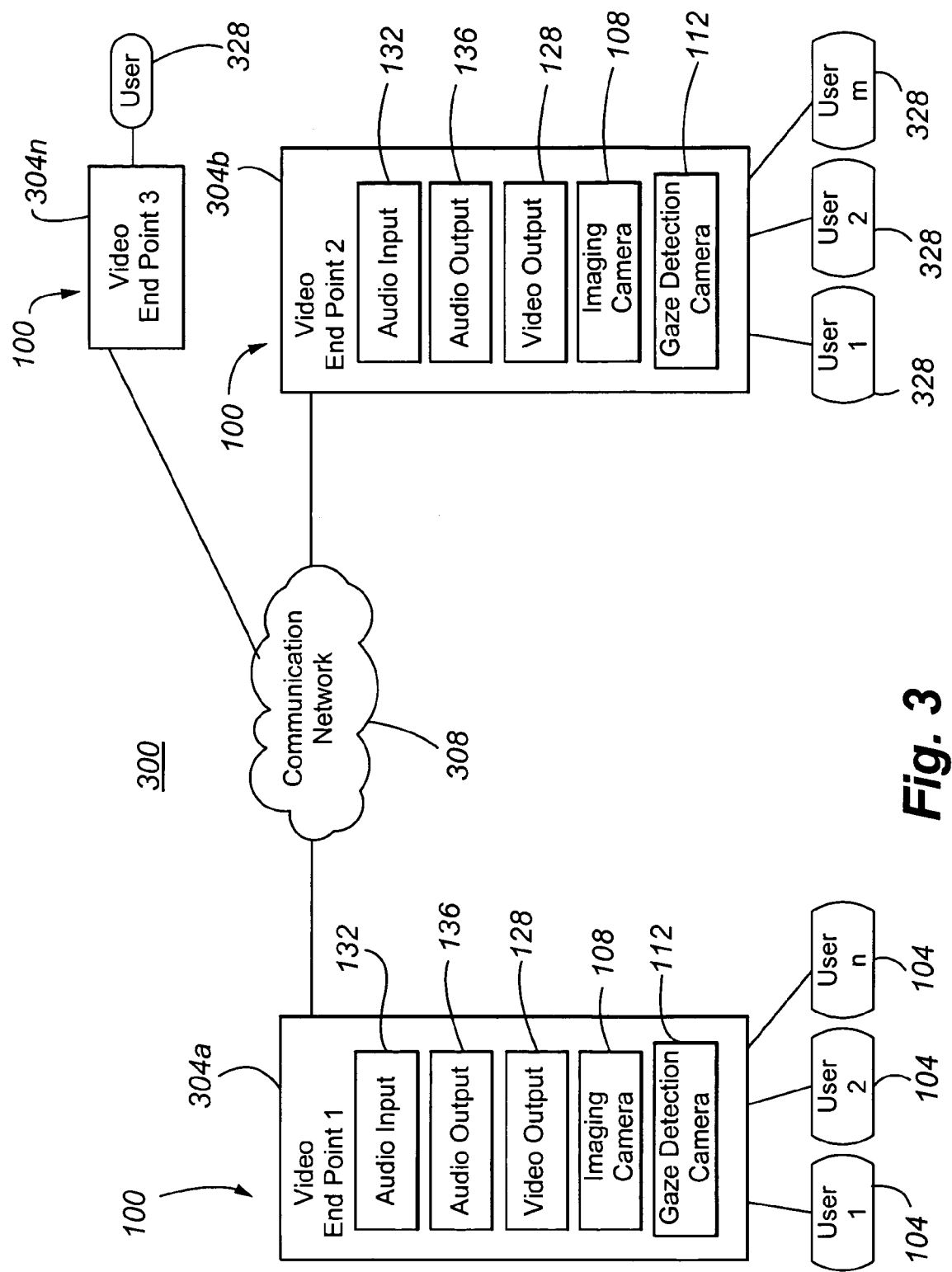
FIG. 3 is a schematic diagram of a system using gaze detection to determine image output in accordance with other embodiments of the present invention.

With reference now to FIG. 3, a system 300 in accordance with further embodiments of the present invention is depicted. In general, the system 300 may comprise a number of video endpoints 304a-n interconnected to one another by a communication network 308. Accordingly, an exemplary system 300 in accordance with embodiments of the present invention provides video conferencing capabilities.

Each video endpoint 304 may comprise a microphone 112, video output 128, and imaging camera 108, and a gaze detection camera or unit 112. In addition, each video endpoint 304 may be associated with one or more users 328. The communication network 308 may comprise one or more communication networks of various types. For example, the communication network 308 may comprise the public switched telephone network (PSTN), a LAN, and/or a WAN, such as the Internet.

In a video conferencing arrangement between first and second video endpoints 304a and 304b, the imaging camera 108 at each video endpoint 304 may provide image information to the other video endpoint 304 for display by the video output 128. In addition, the video provided by a video endpoint 304 to another video endpoint 304 may be controlled in response to a control signal provided by the gaze detection camera or unit 112. For example, a user or person 104 associated with a first video endpoint 304a that most of the other persons 104 associated with that video endpoint 304a are looking at is likely the person who is speaking or who is about to speak. Accordingly, the imaging camera 108 can be controlled so that its output is centered on the person 104 that the other persons 104 are observing. As a further example, if most of the persons 104 associated with a first video endpoint 304a are looking at a white board, chart or other object at their location, the imaging camera 108 can be controlled so that it outputs an image of that object. The controlled image output may then be provided to another video endpoint 304 in communication with the first video endpoint 304 and displayed to the persons 104 associated with that other video endpoint 304 by the video output device 128 at the other location.

A system 300 in accordance with embodiments of the present invention may also be used in connection with video conferences involving more than two video endpoints 304. For example, when the gazes of the persons 104 associated with the first and second video endpoints 304a and 304b are directed to the video output device 128 at those locations, such information may be used to determine that image information from the third video endpoint 304n should be provided for display at the first and second video endpoints 304a and 304b. In addition, a particular area of the scene at the location of the third video endpoint 304 may be selected for display at the first and second video endpoints 304a and 304b, as determined by the gaze of persons 104 at the location of the third video endpoint 304n.

A system 300 may also use output from the gaze detection unit or camera 112 to control the collection and delivery of audio information. For example, one of a number of audio inputs 132 used to collect an audio signal at a video endpoint 304 can be selected as a primary audio input based on its proximity to the area of interest identified using gaze detection. Selection of an audio input 132 as primary can comprise attenuating signals from other audio inputs 132 or feeding only audio information from the primary audio input to other video endpoints 304. As a further example, a directional audio input 132 can be controlled to collect audio information originating from the identified area of interest.

Figure 4:
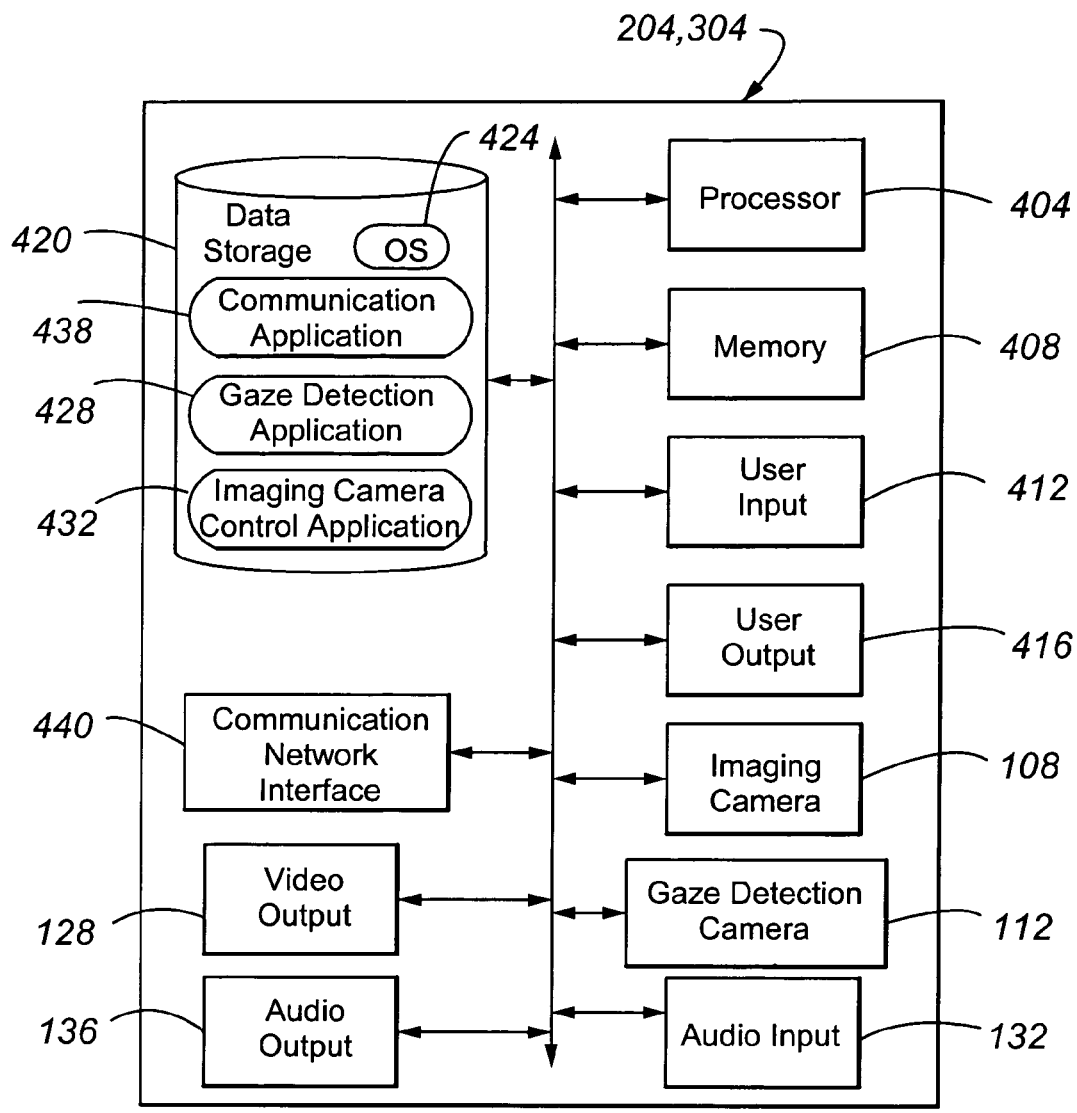
FIG. 4 is a block diagram depicting components of a video endpoint in accordance with embodiments of the present invention.

With reference now to FIG. 4, components that may be provided as part of or in association with a video endpoint 204, 304 are illustrated. The components may include a processor 404 capable of executing program instructions. Accordingly, the processor 404 may include any general purpose programmable processor or controller for executing application programming. Alternatively, the processor 404 may comprise a specially configured application specific integrated circuit (ASIC). The processor 404 generally functions to run programming code implementing various of the functions performed by the communication endpoint 204, 304, including gaze detection and image output control functions, or other applications or functions as described herein.

A video endpoint 204, 304 may additionally include memory 408 for use in connection with the execution of programming by the processor 404 and for the temporary or long-term storage of data or program instructions. The memory 408 may comprise solid state memory resident, removable or remote in nature, such as DRAM and SDRAM. Where the processor 404 comprises a controller, the memory 408 may be integral to the processor 404.

In addition, various user input devices 412 and user output devices 416 may be provided. Examples of input devices 412 include a keyboard, numeric keypad, and pointing device combined with a screen or other position encoder. Examples of user output devices 416 include an alpha numeric display, ringer, printer port or indicator lights.

A video endpoint 204, 304 may also include data storage 420 for the storage of application programming and/or data. For example, operating system software 424 may be stored in the data storage 420. Examples of applications that may be stored in the data storage 420 include gaze detection application software 428, imaging camera control application 432, and/or communication application 438. As can be appreciated by one of skill in the art, a communication application 438 may comprise program instructions for implementing a soft video telephone, for example, where the video endpoint 204, 304 comprises a general purpose computer. Furthermore, the communication application 438 may comprise instructions controlling the operation of a dedicated video endpoint 204, 304 including, for example, a video conference device. The data storage 420 may comprise a magnetic storage device, a solid state storage device, an optical storage device, a logic circuit, or any combination of such devices. It should further be appreciated that the programs and data that may be maintained in the data storage 420 can comprise software, firmware or hardware logic, depending on the particular implementation of the data storage 420.

A video endpoint 204, 304 may also include one or more communication network interfaces 440. For example, a video endpoint 204, 304 may include a communication network interface 440 comprising a network interface card (NIC), a modem, a telephony port, or other wire line or wireless communication network interface.

In addition, a video endpoint 204, 304 generally includes one or more imaging cameras 108 and one or more gaze detection cameras 112. As noted elsewhere herein, the imaging camera 108 and gaze detection camera 112 may be integrated into a single device.

A video endpoint 304 for use in connection with two-way video communications may also include a video output 128. Examples of a video output 128 include a cathode ray tube (CRT), liquid crystal display (LCD), plasma display or other device capable of reproducing transmitted video images. Furthermore, a video endpoint 204, 304 may include one or more audio inputs 132, such as one or more microphones 132 for receiving audio information from users 104. In addition, an audio output device 136, such as one or more speakers or headphones may be provided for outputting audio information, for example, received from another video endpoint 304.

As can be appreciated by one of skill in the art from the description provided herein, a video endpoint 204, 304 will generally include or be associated with those components and functions necessary to support the included features of the video endpoint 204, 304. Accordingly, a particular endpoint 204, 304 need not include each of the components and applications illustrated in FIG. 4. Furthermore, included components and applications can be implemented as or dispersed among physically or logically separate components.

As can be appreciated by one of skill in the art from the description provided herein, a video endpoint 204, 304 may comprise a general purpose computer and associated peripheral devices. In accordance with other embodiments of the present invention, a video endpoint for use in connection with video surveillance may comprise either a first video endpoint for collecting image and gaze information or a second video endpoint for displaying image information collected by the first video endpoint that is related to an area determined to be of significance. Either or both of the endpoints associated with a surveillance system may comprise a general purpose computer, a dedicated programmable device, or an embedded device. In accordance with still other embodiments of the present invention, a video endpoint for use in video conferencing may comprise one or more dedicated video conferencing systems incorporating gaze detection for use in controlling image output as described herein. Such video conferencing systems may comprise a dedicated programmable device or an embedded device.

Figure 5:
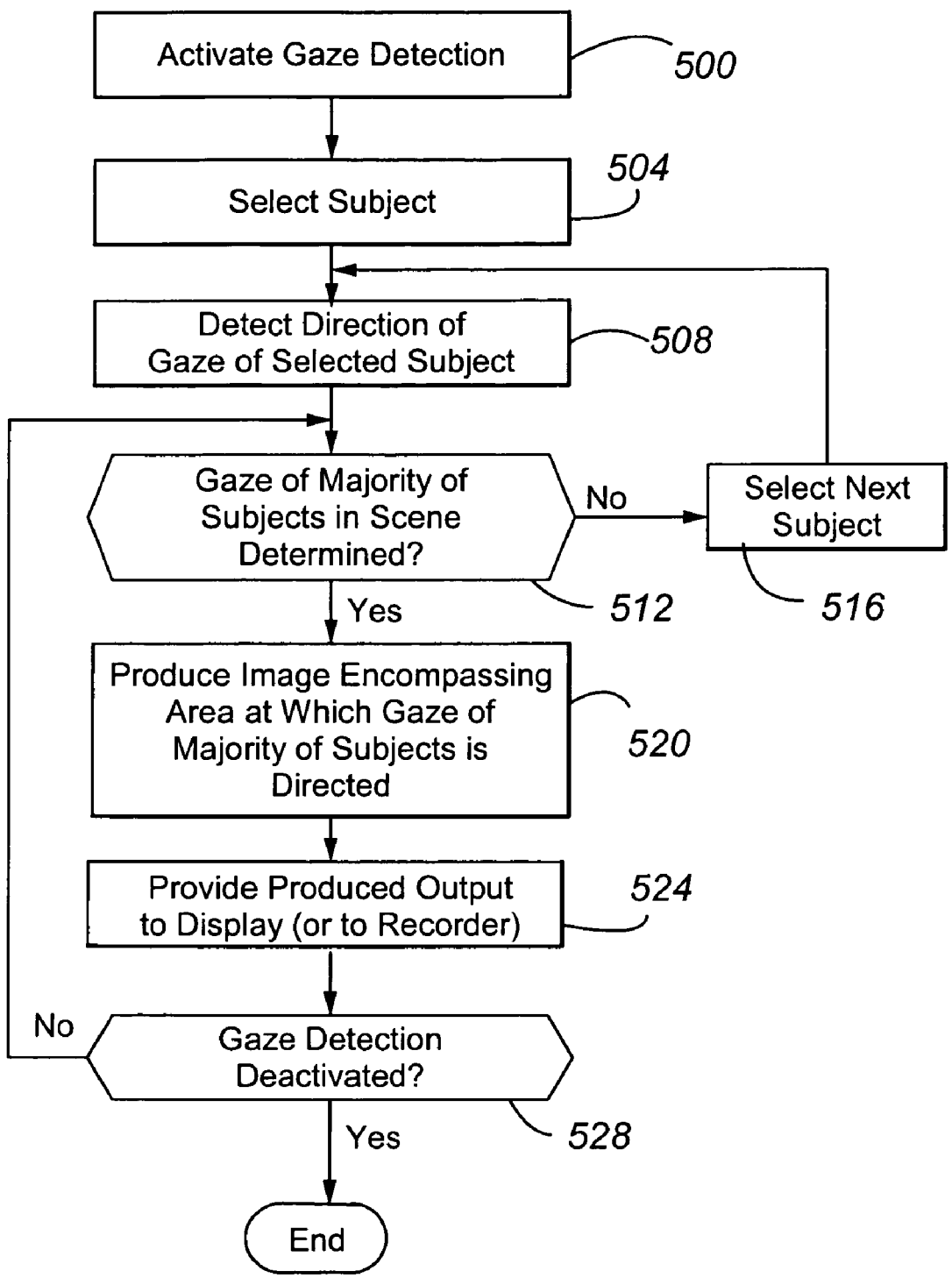
FIG. 5 is a flow chart depicting aspects of the operation of a system in accordance with embodiments of the present invention.

With reference now to FIG. 5, aspects of the operation of a system in accordance with embodiments of the present invention are illustrated. Initially, at step 500, gaze detection is activated. For example, the user of a video endpoint 204, 304 may enable a gaze detection function. At step 504, a subject is selected. In general, a subject is a person within a scene at a location from which an image is to be taken. The direction of the gaze or line of sight of the selected subject is then detected (step 508). As can be appreciated by one of skill in the art, the direction of the gaze of a selected subject or person can be determined based on the output from an imaging device, such as a gaze detection camera 112 or an imaging camera 108, that provides a view of the face of the selected subject. As can also be appreciated by one of skill in the art, the gaze of a subject may be the direction that a person at a scene has been looking in for at least a first predetermined period of time.

A determination may then be made as to whether the gaze of a majority of the subjects within a scene has been determined (step 512). If the direction of the gaze of a majority of the persons within a scene has not been determined, a next subject is selected (step 516) and the process returns to step 508. If the direction of the gaze of a majority of the subjects within a scene has been determined, an image is produced that encompasses the area intersected by the gazes of a majority of the subjects (step 520). As can be appreciated by one of skill in the art from the description provided herein, production of an image encompassing an area at which the gaze of a majority of subjects within a scene is directed (i.e. an area that most of the people in a scene are looking at) can be formed by panning and adjusting the field of view (i.e. zooming) an imaging camera 108 at the location of the scene to obtain an image of that area. Alternatively or in addition, producing an image of the area intersected by the gazes of persons within the scene can comprise cropping an image obtained by an imaging camera 108 to include only the selected area. At step 524, the output produced at step 520 is provided to a display 128, 208 and/or to a video recorder 216.

At step 528, a determination may be made as to whether gaze detection has been deactivated. If gaze detection has not been deactivated, the process may return to step 512. If gaze detection has been deactivated, the process may end.

In accordance with further embodiments of the present invention, gaze detection as described herein may be applied to addressing or assisting in blind source separation where a number of audio inputs 132 are deployed as part of a video endpoint 204, 304. For example, a microphone located near and in front of a current speaker, identified using gaze detection, may be selected as the primary audio input 132, and signals from other microphones at that video endpoint 204, 304 can be attenuated or blocked. This can improve the perceived quality of the audio signal delivered to listeners at other video endpoints 204, 304 by reducing or eliminating noise that would otherwise be introduced as part of the audio signal. In addition, embodiments of the present invention may use gaze detection to determine an area from which audio information is collected, for example in connection with surveillance applications.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with the various modifications required by their particular application or use of the invention. It is intended that the appended claims be construed to include alternative embodiments to the extent permitted by the prior art.

What is claimed is:

1. A method for controlling a video camera, comprising:
   determining a line of sight of at least one person at a first location; and
   obtaining an image of a first area intersected by said line of sight of said at least one person at said first location using a first imaging camera at said first location;
   obtaining an image of a face of at least one person at a second location;
   determining a line of sight of said at least one person at said second location;
   obtaining an image of a face of at least one person at a third location;
   determining a line of sight of said at least one person at said third location; and
   in response to determining that said line of sight of said at least one person at said first location is directed to a display at said first location and to determining that said line of sight of said at least one person at said second location is directed to a display at said second location, displaying at said first and second locations at least a portion of an image obtained by said third imaging camera at a third location.

2. The method of claim 1, wherein said determining a line of sight of at least one person at said first location comprises determining a direction in which said at least one person has been looking for at least a first predetermined period of time.

3. The method of claim 1, further comprising:
   obtaining an image of a face of a plurality of persons at said first location; and
   determining a line of sight of each of said plurality of persons, wherein said first area at which said first imaging camera is pointed is an area intersected by said lines of sight of at least most of said plurality of persons.

4. The method of claim 3, wherein said determining a line of sight of each of said plurality of persons at said first location comprises determining a direction in which at least most of said plurality of persons have been looking for at least a first predetermined period of time.

5. The method of claim 1, further comprising:
   obtaining an image of a face of a plurality of persons at said first location; and
   determining a line of sight of at least some of said plurality of persons, wherein said first area at which said first imaging camera is pointed is an area through which said line of sight of a greatest number of said plurality of persons passes.

6. The method of claim 1, wherein said obtaining an image of a first area comprises pointing said first imaging camera at said first location.

7. The method of claim 1, wherein said obtaining an image of a first area comprises zooming said first imaging camera in on said first area.

8. The method of claim 1, further comprising;
   displaying at said second location at least a portion of said image obtained by said first imaging camera.

9. The method of claim 1, further comprising displaying said image of said first area imaged by said first imaging camera in real time.

10. The method of claim 1, wherein said determining a line of sight of at least one person at a first location includes obtaining an image of a face of at least one person at said first location comprises using a gaze detection camera to obtain said image.

11. The method of claim 1, further comprising:
    detecting a change in said line of sight of said at least one person at said first location;
    pointing said first imaging camera at said first location at a second area included in said changed line of sight of said at least one person at said first location.

12. The method of claim 1, wherein a second person is within said first area, said method further comprising identifying said second person.

13. The method of claim 1, further comprising:
    determining a location of an area or object of interest within or near said first location from said line of sight of said at least one person at said first location.

14. The method of claim 1, further comprising determining a point of convergence of lines of sight of a number of persons at said first location.

15. The method of claim 1, further comprising at least one of:
    1) selecting an audio input positioned to receive an audio signal from said first area as a primary audio input, and
    2) attenuating an audio input not positioned to receive an audio signal from said first area.

16. The method of claim 1, further comprising controlling an audio input to receive an audio signal from said first area.

17. The method of claim 1, wherein said method is performed by a computational component comprising a computer readable storage medium containing instructions for performing the method.

18. The method of claim 1, wherein said method is performed by a computational component comprising a logic circuit.

19. A system for controlling a displayed image, comprising:
    a first gaze detection module, wherein a direction of a gaze of at least one person at a first location is determined;
    a first display at said first location;
    a first camera control module, wherein said first camera control module receives information related to said determined direction of a gaze of at least one person at said first location;
    a first imaging camera at said first location, wherein an output derived from said first imaging camera includes image information from an area intersected by said gaze of said at least one person at said first location;
    a second gaze detection module, wherein a direction of a gaze of at least one person at a second location is determined;
    a second display at said second location;
    a second camera control module, wherein said second camera control module receives information related to said determined direction of a gaze of at least one person at said second location;
    a second imaging camera at said second location, wherein an output derived from said second imaging camera includes image information from an area intersected by said gaze of said at least one person at said second location;

a third gaze detection module, wherein a direction of a gaze of at least one person at a third location is determined;

a third display at said third location;

a third camera control module, wherein said third camera control module receives information related to said determined direction of a gaze of at least one person at said third location;

a third imaging camera at said third location, wherein an output derived from said third imaging camera includes image information from an area intersected by said gaze of said at least one person at said third location, wherein in response to determining that the area intersected by said gaze of said at least one person at said first location is directed to said display at said first location, and in response to determining that the area intersected by said gaze of said at least one person at said second location includes said display at said second location, at least a portion of an image obtained by said third imaging camera at said third location is displayed by said first display and said second display.

20. The system of claim 19, further comprising a communication network, wherein said output derived from said first imaging camera is provided to said display at said second location by said communication network in substantially real time, and wherein said output derived from said second imaging camera is provided to said display at said first location by said communication network in substantially real time.

21. The system of claim 19, further comprising:
a first microphone at said first location;
a first speaker at said first location;
a second microphone at said second location;
a second speaker at said second location, wherein audio information received by said first microphone is output by said second speaker, and wherein audio information obtained by said second microphone is output by said first speaker.

22. The system of claim 19, wherein said gaze detection module includes software running on a processor, and wherein an input to said gaze detection module comprises image information from at least one of said first imaging camera and said second imaging camera.

23. The system of claim 19, wherein said gaze detection module includes a gaze detection camera.

24. The system of claim 19, further comprising a video recorder, wherein said output derived from said first imaging camera is provided to said video recorder.

25. The system of claim 19, further comprising an audio input, wherein an area from which said audio input receives audio information is controlled in response to output from said first gaze detection module to include said area intersected by said gaze of said at least one person at said first location.

26. The system of claim 19, further comprising a plurality of audio inputs, wherein a signal from at least one of said audio inputs is attenuated or amplified based on said determined direction of a gaze of at least one person at said first location.

27. A system for controlling a video output, comprising:
means for detecting a gaze of at least a first person at a first location, wherein a line of sight of said at least a first person is determined;
means for obtaining an image of a scene at said first location;
means for displaying an image at said first location;
means for detecting a gaze of at least a first person at a second location, wherein a line of sight of said at least a first person is determined;
means for obtaining an image of a scene at said second location;
means for displaying an image at said second location;
means for detecting a gaze of at least a first person at a third location, wherein a line of sight of said at least a first person is determined;
means for obtaining an image of a scene at said third location; and
means for controlling an image that is displayed, wherein in response to determining that a line of sight of said at least a first person at said first location is directed to said means for displaying an image at said first location and to determining that said line of sight of said at least a first person at said second location is directed to said means for displaying an image at said second location at least a portion of an image obtained from said third location is displayed at said first and second locations.

28. The system of claim 27, wherein said means for obtaining an image of a scene at a first location provides output to said means for detecting a gaze of at least a first person and to said means for controlling an image.

29. The system of claim 27, wherein said means for controlling an image that is displayed controls at least one of a pointing direction and an angle of view of said means for obtaining an image at said third location.

30. The system of claim 27, wherein said image is displayed at a second location.

31. The system of claim 27, further comprising:
means for obtaining audio information from said scene at said first location, wherein an area from which said audio information is obtained is controlled in response to an output from said means for detecting a gaze.

* * * * *